United States Patent
Kullin et al.

(10) Patent No.: US 10,385,822 B2
(45) Date of Patent: Aug. 20, 2019

(54) WIND TURBINE ROTOR SHAFT ARRANGEMENT

(71) Applicants: Arne Lars Jonas Kullin, Landvetter (SE); Juergen Reichert, Donnersdorf (DE); Hans Wendeberg, Västra Frölunda (SE)

(72) Inventors: Arne Lars Jonas Kullin, Landvetter (SE); Juergen Reichert, Donnersdorf (DE); Hans Wendeberg, Västra Frölunda (SE)

(73) Assignee: Aktiebolaget SKF, Göteborg (SE)

( * ) Notice: Subject to any disclaimer, the term of this patent is extended or adjusted under 35 U.S.C. 154(b) by 454 days.

(21) Appl. No.: 14/856,598

(22) Filed: Sep. 17, 2015

(65) Prior Publication Data

US 2016/0090966 A1    Mar. 31, 2016

(30) Foreign Application Priority Data

Sep. 26, 2014    (SE) ...................................... 1451135

(51) Int. Cl.
*F03D 1/06*    (2006.01)
*F03D 80/70*    (2016.01)
(Continued)

(52) U.S. Cl.
CPC .............. *F03D 1/06* (2013.01); *F03D 80/70* (2016.05); *F03D 80/88* (2016.05); *F16C 19/30* (2013.01);
(Continued)

(58) Field of Classification Search
CPC . F03D 1/06; F03D 80/88; F03D 80/70; F16C 33/34; F16C 2360/31
See application file for complete search history.

(56) References Cited

U.S. PATENT DOCUMENTS 4,557,613 A * 12/1985 Tallian .................. F16C 23/086
                                                    384/568
4,783,181 A * 11/1988 Takata .................. F16C 23/086
                                                    384/450
(Continued)

FOREIGN PATENT DOCUMENTS

CN            2120913 U      11/1992
CN         101371056 A       2/2009
(Continued)

*Primary Examiner* — Eldon T Brockman
(74) *Attorney, Agent, or Firm* — Bryan Peckjian; SKF USA Inc. Patent Dept.

(57) ABSTRACT

A wind turbine rotor shaft arrangement comprising a shaft supporting wind turbine blades and a non-rotating first housing structure (mounted to a wind turbine nacelle framing) along with a first rolling bearing supporting (in a first axial direction) the shaft to the first housing structure at a first support point. The first rolling bearing is a self-aligning bearing comprising a first inner ring, a first outer ring and a set of rolling elements interposed therebetween. Each roller is asymmetric, having a curved raceway-contacting surface contacting at least one of the curved inner/outer raceways of the first inner/outer ring, respectively. A contact angle between each roller and the respective raceway is inclined respective to the shaft radial direction. A non-rotating second housing structure (mounted to the wind turbine nacelle framing) supports the shaft. A second rolling bearing supports the shaft by the second housing structure at a second support point.

15 Claims, 4 Drawing Sheets

(51) Int. Cl.
*F03D 80/80* (2016.01)
*F16C 19/30* (2006.01)
*F16C 23/08* (2006.01)
*F16C 25/08* (2006.01)
*F16C 33/36* (2006.01)
*F16C 19/36* (2006.01)
*F16C 19/54* (2006.01)

(52) U.S. Cl.
CPC ............ *F16C 23/086* (2013.01); *F16C 25/08* (2013.01); *F16C 33/36* (2013.01); *F16C 19/36* (2013.01); *F16C 19/543* (2013.01); *F16C 19/548* (2013.01); *F16C 2300/14* (2013.01); *F16C 2360/31* (2013.01); *Y02E 10/721* (2013.01); *Y02E 10/722* (2013.01); *Y02E 10/726* (2013.01)

(56) References Cited

U.S. PATENT DOCUMENTS

| | | | | |
|---|---|---|---|---|
| 5,145,267 | A * | 9/1992 | Takata | F16C 23/086 384/558 |
| 7,537,391 | B2 * | 5/2009 | Smook | F16C 19/26 384/513 |
| 7,918,649 | B2 * | 4/2011 | Nakagawa | F16C 19/505 384/450 |
| 7,922,396 | B2 * | 4/2011 | Mori | F16C 23/086 384/450 |
| 8,673,829 | B2 * | 3/2014 | Kawamura | C10M 169/044 508/110 |
| 9,046,128 | B2 * | 6/2015 | Silverio | F16C 19/38 |
| 2003/0019106 | A1 * | 1/2003 | Pope | A61L 27/04 29/898 |
| 2007/0127858 | A1 * | 6/2007 | Nakagawa | F16C 19/505 384/495 |
| 2007/0127859 | A1 * | 6/2007 | Smook | F16C 19/26 384/569 |
| 2007/0297706 | A1 * | 12/2007 | Mori | F16C 23/086 384/558 |
| 2012/0070110 | A1 * | 3/2012 | Owens | F16F 1/34 384/563 |
| 2012/0121420 | A1 * | 5/2012 | Yuki | C21D 1/10 416/174 |
| 2015/0139583 | A1 | 5/2015 | Kullin et al. | |
| 2016/0258482 | A1 | 9/2016 | Kullin et al. | |

FOREIGN PATENT DOCUMENTS

| | | |
|---|---|---|
| CN | 101918711 A | 12/2010 |
| DE | 102010054318 A1 | 6/2012 |
| EP | 1705392 A1 | 9/2006 |
| WO | 2014031054 A1 | 2/2014 |

* cited by examiner

WIND TURBINE ROTOR SHAFT ARRANGEMENT

CROSS REFERENCE TO RELATED APPLICATIONS

This is a Non-Provisional Patent Application, filed under the Paris Convention, claiming the benefit of Sweden (SE) Patent Application Number 1451135-6, filed on 26 Sep. 2014 (26.09.2014), which is incorporated herein by reference in its entirety.

TECHNICAL FIELD

The present disclosure relates to wind turbines, and specifically to wind turbine rotor shaft arrangements comprising rolling bearings for supporting said rotor shaft.

BACKGROUND

Wind turbines are well known and have become an increasingly used application for generating electrical power. Wind turbines are for instance characterized by having an essentially horizontal rotor shaft located in a nacelle framing at the top of a high tower. The essentially horizontal rotor shaft is supporting wind turbine rotor blades. Wind energy is via the rotor blades transferred into kinetic energy by the rotation of the rotor shaft, which in turn is connected to a generator that generates electrical energy. Sometimes also a gearbox is mounted in-between the rotor shaft and the generator. There are also examples of wind turbines arranged with a vertical rotor shaft.

The increased sizes of wind turbines constantly lead to higher requirements of the mechanical components in the wind turbine. One of the most important and demanding mechanical component(s) in a wind turbine is/are the bearing(s) that support the rotor shaft. The supporting bearing(s) for the rotorshaft have to accommodate very high forces, both axial, radial and combinations of axial and radial forces, and also high bending moments and torque.

To this end a number of different bearing types and arrangements are used for supporting the rotor shaft. One example of a bearing arrangement used is to have two tapered roller bearings located remotely from each other to support the rotor shaft. These bearings are designed to be able to accommodate high radial and axial forces (in one direction). By mounting two bearings of this kind remotely (in O- or X-arrangement) onto a rotor shaft it is possible to accommodate radial forces and also axial forces in both directions.

SUMMARY

In view of the above, objects of the present invention are to provide a bearing arrangement that 1) ameliorates at least some of the drawbacks of the prior art, 2) provides a reliable solution that can accommodate high forces and 3) at least provides a useful and good alternative to the known wind turbine bearing arrangements.

These and other objects are met by the subject matters provided in the independent claim. Preferred embodiments of the invention are presented in the dependent claims. The objects have been achieved by a wind turbine rotor shaft arrangement, comprising: a rotor shaft for supporting wind turbine blades, a non-rotating first housing structure for supporting the rotor shaft, which first housing structure is arranged to be mounted to a wind turbine nacelle framing, and a first rolling bearing arranged to support, in a radial direction and in at least a first axial direction, the rotor shaft in relation to the first housing structure at a first support point, which first rolling bearing is a single row self-aligning bearing comprising a first inner ring, a first outer ring and a set of rolling elements formed of rollers interposed between the first inner and outer rings. In addition, each roller is an asymmetrical roller and has a curved raceway-contacting surface arranged in contact with a curved inner raceway of the first inner ring and in contact with a curved outer raceway of the first outer ring, and wherein a contact angle between each roller and the inner and/or outer raceway is inclined in relation to the radial direction of the rotor shaft. Furthermore, the arrangement comprises a non-rotating second housing structure for supporting the rotor shaft, which second housing structure is arranged to be mounted to the wind turbine nacelle framing, and a second rolling bearing arranged to support the rotor shaft in relation to the second housing structure at a second support point.

It has been realized by the inventors that by incorporating a rolling bearing as the aforementioned first rolling bearing to a wind turbine bearing arrangement a more compact and reliable bearing arrangement can be accomplished. The inclined angle of the raceways leads to that the bearing can accommodate high loads both in the axial and radial direction of the rotor shaft. In addition, the self-aligning capability due to the curved profile of the raceways and rollers will significantly reduce edge stresses in the zone between raceways and roller ends. Especially, the configuration of the first self-aligning rolling bearing will lead to that the first outer ring and the first inner ring can be relatively misaligned, caused by e.g. deflections of the shaft.

The asymmetri of the rollers are seen in the axial direction of the rollers, more specifically the asymmetri is seen along a rotational axis of each roller.

In an embodiment of the invention, the second rolling bearing is a single row self-aligning bearing, arranged to support in radial direction and in a second opposite axial direction, and comprising a second inner ring, a second outer ring and a second set of rolling elements formed of rollers interposed between the second inner and outer ring, and wherein a contact angle between each roller and the inner and/or outer raceway is inclined in relation to the radial direction of the rotor shaft. In a further embodiment, each roller is an asymmetrical roller and has a curved raceway-contacting surface arranged in contact with a curved inner raceway of the second inner ring and in contact with a curved outer raceway of the second outer ring. By having a second rolling bearing with a similar design as the first rolling bearing an even further improved bearing arrangement can be realized, leading both to an increased compactness and reliability. With this configuration, it is also possible to make use of high bearing preload, which will lead to an increased system stiffness of the wind turbine, which may further increase the service life of the wind turbine arrangement. Furthermore, for the second bearing position, a self-aligning capability will be realized. Due to this, each bearing in the bearing arrangement will be able to misalign (caused e.g. by deflections of the shaft), which significantly reduce the risk of e.g. edge stresses in the zone between the bearing raceways and roller ends. One advantage due to this is that a more compact bearing arrangement can be realized even though there are very high loads in the wind turbine application. Therefore, this bearing arrangement is especially well suited for larger wind turbines. An example of a very large wind turbine is a turbine that can produce electrical power up to, or even more than, 5 Megawatts (MW). The first and second rolling bearing can be arranged in a face to face or back to back arrangement, also known as X- and O-arrangement. The arrangement will due to these two bearings be able to withstand very high loads in both axial directions of the rotor shaft. Due to the fact that the axial loads are highest in the direction of the wind the bearing accommodating axial forces in this direction can be designed to be larger and thus accommodate higher axial forces than the other bearing supporting axial forces in the opposite axial direction. It is thus not necessary to use two rolling bearings of similar size and/or weight, and therefore the solution may be even more compact.

In an embodiment, a radius of the curved outer raceway of the first or second outer ring extends from a center point from a bearing axis of the first or second rolling bearing respectively. This configuration of the bearings gives a good self-aligning capability, i.e. that the outer ring and the inner ring of the bearing can be relatively misaligned. In connection to this, the improved self-aligning capability will lead to that the bearing does not need to be designed and/or adapted for accommodating e.g. large edge stresses in the contact zone between roller ends and raceways of the bearing rings. As a consequence, the bearing can be a smaller bearing compared to if the bearing did not present this improved self-aligning capability. The reduced size and weight of the bearings are advantageous for wind turbines, where the bearing arrangement is located at the top of the wind turbine tower. In addition, this is especially advantageous for larger wind turbines, such as for instance wind turbines able of producing electrical power of up to, or even more than, 5 MW.

In an embodiment, at least one of the first or second inner ring presents a flange located adjacent to the curved raceway of the first or second inner ring or outer ring respectively. The flange will be able to guide the rollers in the bearing and/or to retain the rollers in the bearing. Thus, the flange is designed to be able to be in contact with the roller ends of the set of rollers in the first and/or second rolling bearing. The contact zone may preferably be made so that the risk of increased stresses is reduced. This may for instance be done by having no sharp edges in the area between the flange and the raceway. In addition, the roller ends may be designed without any sharp edges between the axial ends of the rollers and the curved roller profiles. The roller guidance due to the flange will reduce the risk and presence of roller skew. Especially, the flange will assure that the rollers are not skewed when entering the loaded zone, i.e. the rollers will enter "straight" into the loaded zone and also the rollers will not be skewed when they are in the loaded zone of the bearing. Roller skew is when the rollers are tilted from their normal and preferred rolling path in-between the raceways of the bearing rings. The retaining function of the flange may be extra advantageous during assembly of the bearing and/or during mounting of the bearing onto the rotor shaft. In an embodiment, the inner ring of the first or second bearing presents a second flange located on the opposite side of the first flange and adjacent to the raceway. This may further improve the retaining function of the roller set in the rolling bearing. Thus, the at least one flange may be any, or a combination, of a guiding flange or a roller retaining flange.

In an embodiment, the first and second rolling bearings are located axially remotely from each other on the rotor shaft. In another embodiment, the first and second rolling bearings are located axially adjacent to each other on the rotor shaft. In yet a further embodiment, the first and second inner rings of the first and second rolling bearings are integrated. Thus, the first and second rolling bearing will be a single bearing unit. This may lead to an even further compact bearing arrangement. The first and second rolling bearing may be arranged in a face to face or back to back arrangement (also known as X- and O-arrangement), which will lead to that the bearing will be able to accommodate radial loads and also axial loads in both opposite directions. Also, the bearing will be able to accommodate moment loads. Since the axial forces are largest in the direction of the wind, the first and second rolling bearing may be of different sizes. Thus, one of the first and second rolling bearing may be reduced in size, leading to a more compact bearing arrangement, including a reduction of the weight. In yet a further embodiment, the first and second outer rings of the first and second rolling bearings are integrated. Thus, this will also lead to that the first and second rolling bearing will be a single bearing unit, having the same advantages as if the inner rings of the first and second rolling bearing are integrated.

In an embodiment, the at least one of the first and second outer ring presents a mounting flange for mounting the first and/or second rolling bearing to the first or second housing structure or to the shaft. The mounting flange may be protruding in a radial direction of the first or second outer ring around the circumference of the first or second outer ring. In an embodiment, the mounting flange is divided into several flange sections along the circumference of the first or second outer ring. For instance, there may be three flange sections equally distributed along the circumference of the first or second outer ring and extending in a radial direction out from the first or second outer ring. In an embodiment, the mounting flange or flange sections present mounting bores meant to be able to receive e.g. mounting screws/bolts and wherein the corresponding housing structure or shaft presents bores into which the screws are fastened, thereby fixating the rolling bearing to the housing structure. By having a mounting flange the mounting procedure of the rolling bearing is facilitated. For instance, the bearing clearance or preload can be preset before the bearing is mounted, which may significantly prolong the service life of the bearing. A bearing mounted incorrectly could lead to a decrease in bearing service life. Consequently, a mounting flange may reduce the risk of incorrect mounting. The definition of bearing clearance is something that is well recognized by a person skilled in the art. Like for the outer rings, the inner rings may also present mounting flanges for mounting the rolling bearing onto a fixed or rotating structure, e.g. a housing structure or a shaft. The mounting flange may be configured in a similar manner as for the outer ring. The advantages of having the flange on the inner ring are similar as to having the mounting flange on the bearing's outer ring.

In an embodiment, the first and/or second rolling bearing is a spherical roller thrust bearing.

In an embodiment, the second rolling bearing is any of a spherical roller bearing, a self-aligning torus bearing or a toroidal roller bearing.

In an embodiment, the second rolling bearing is any of a tapered roller bearing or cylindrical roller bearing.

In an embodiment, the outer rings of the first and second rolling bearing are meant to be rotating in the wind turbine rotor shaft arrangement while the inner rings are non-rotating. In another embodiment, the inner rings of the first and second rolling bearing are meant to be rotating in the wind turbine rotor shaft arrangement while the outer rings are non-rotating.

In an embodiment of the wind turbine rotor shaft arrangement, the inclined contact angle of the first rolling bearing is in the range of 10 to 55 degrees. By having a contact angle in this range it is possible to accommodate large axial forces caused by the pressure from the wind onto the wind turbine rotor blades. This is especially evident in larger wind turbines presenting large wind turbine rotor blades. In another embodiment, the contact angle is essentially 45 degrees. The contact angle of the bearing may be configured based on the sizes of the axial and radial loads in the specific wind turbine.

In an embodiment of the wind turbine rotor shaft arrangement, in the case when the contact angle of the second rolling bearing between each roller and the inner and/or outer raceway is inclined in relation to the radial direction of the rotor shaft, the contact angle is in the range of 10 to 55 degrees. In a further embodiment, the contact angle is essentially 45 degrees. Also here, the contact angles may be configured based on the sizes of the axial and radial loads. The contact angles of the first and second rolling bearing may be similar but they may also be different. For instance, the contact angles for the first and second rolling bearing may be set to accommodate very large axial loads in one direction and lower axial loads in the opposite axial direction. Preferably, the wind turbine rotor shaft arrangement is arranged to accommodate large axial loads in the direction of the wind and lower axial loads in the opposite axial direction.

In an embodiment of the wind turbine rotor shaft arrangement, the wind turbine rotor shaft is essentially horizontal. In another embodiment, the wind turbine rotor shaft is essentially vertical.

In an embodiment, the first and second rolling bearing of the wind turbine rotor shaft arrangement are large size rolling bearings. A large size rolling bearing may be defined as a bearing that presents an outer diameter of 500 mm or more.

In an embodiment, a mounting sleeve is located between the rotor shaft of the wind turbine and at least one of the first and second rolling bearing. The mounting sleeve may be a cylindrically shaped element with a cylindrically shaped inner bore surface and an outer circumferential surface onto which at least one of the first and second inner rings can be mounted. The cylindrically shaped outer surface of the mounting sleeve may be conically shaped and the corresponding inner circumferential surface of the inner ring may also have a conical shape. By driving up the inner ring onto the conically shaped outer surface of the mounting sleeve an interference fit can be obtained, leading to a reliable mounting of the bearing onto the rotor shaft. For instance, there may be only one mounting sleeve for the first and second inner ring or alternatively there may be one mounting sleeve each for the first and second inner ring. Especially, in the embodiment where the first and second inner rings are located adjacent to each other or in the embodiment where the first and second inner rings are integrated there may only be a need for one mounting sleeve. In such case the mounting sleeve may be designed to present two different outer diameters on the outer circumferential surface, one first diameter for receiving the first inner ring and one second diameter for receiving the second inner ring. The first and second diameter may be different in the case when the first and second rolling bearings are of different sizes. As mentioned above, there may be a possibility to have bearings of different sizes due to that the load characteristics are different in the two opposite axial directions of the rotor shaft, due to the fact that the largest axial load is in the direction of the wind of the wind turbine.

In an embodiment, the wind turbine rotor arrangement is a 3-point suspension arrangement. Such arrangement would include a third bearing. 3-point bearing arrangements are well recognized by the skilled person.

In an embodiment, the wind turbine presents a gearbox connected to the rotor shaft. The gearbox is transferring torque to an electrical generator, wherein the gearbox and generator are located in the nacelle of the wind turbine. In another embodiment, there is no gearbox present in the wind turbine. In addition, in a further embodiment, the generator may be located in a radially outer position of the wind turbine bearing arrangement. In this specific embodiment the bearing arrangement may be configured so that the outer rings of the first and second rolling bearings are meant to rotate and wherein the inner rings are stationary.

In an embodiment, at least one of the first or second rolling bearing presents a coating on any of its surfaces. For instance, a raceway of at least one of the rolling bearings may be coated, such as a coating for electrical insulation, corrosion resistance, friction reduction etc. In another embodiment, at least one of the rolling elements of the first and/or second rolling bearing presents a coating.

In an embodiment, the bearing clearance in the wind turbine bearing arrangement is set to essentially zero. In another embodiment, the rolling bearings in the wind turbine bearing arrangement present a preload, i.e. there is no clearance in the rolling bearings.

In an embodiment, at least one of the first or second rolling bearing presents a cage or retainer for the rolling elements. The cage may be made of any kind of suitable material, such as sheet steel, steel, brass or plastics. In another embodiment, the rolling elements in at least one of the first or second rolling bearing are separated by spacer elements. The spacer elements are single elements which separate the rolling elements and may be made of any kind of material, such as plastics, steel, brass etc. In a further embodiment, the rolling elements of at least one of the first or second rolling bearing presents a plurality cage segments for retaining the rollers. The cage segments may also be made of any kind of suitable material such as steel, plastics or brass.

In an embodiment, at least one of the first or second rolling bearing presents a tapered bore. In another embodiment, at least one of the first or second rolling bearing presents a cylindrical bore. Thus any or both rolling bearings may have a cylindrical or a tapered bore depending on how the bearings shall be mounted onto the shaft/housing.

In an embodiment, the bearing arrangement presents at least one sensing element for sensing a load, rotational speed, temperature, acoustic emission etc. In a further embodiment, the at least one sensing element is part of a condition monitoring system for monitoring a condition of the bearing arrangement.

It shall be noted that any combinations of the aforementioned embodiments of the invention are possible unless expressed or indicated otherwise.

BRIEF DESCRIPTION OF DRAWINGS

Exemplifying embodiments of the present invention will now be described in more detail, with reference to the accompanying drawings, wherein.

The drawings show diagrammatic exemplifying embodiments of the present invention and are thus not drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF EMBODIMENTS

Figure 1:
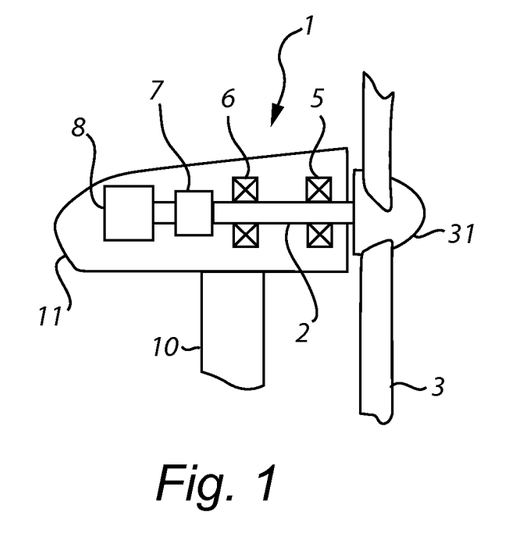
FIG. 1 shows a wind turbine nacelle comprising a rotor shaft and two bearings for supporting the rotor shaft according to an embodiment of the present invention.

FIG. 1 illustrates a wind turbine nacelle 11 comprising a wind turbine rotor shaft arrangement 1 according to an embodiment of the present invention. The nacelle 11 is mounted on top of a tower 10. Rotor blades 3 are mounted to a hub 31, which in turn is mounted to a rotor shaft 2. A first rolling bearing 5 is arranged to support the shaft 2 at a first support point in relation to a first housing structure (not seen in this figure). Furthermore, a second rolling bearing 6 is arranged to support the shaft 2 at a second support point in relation to a second housing structure (not seen in this figure). The rotor shaft 2 is arranged to drive a generator 8 via a gearbox 7.

Figure 2:
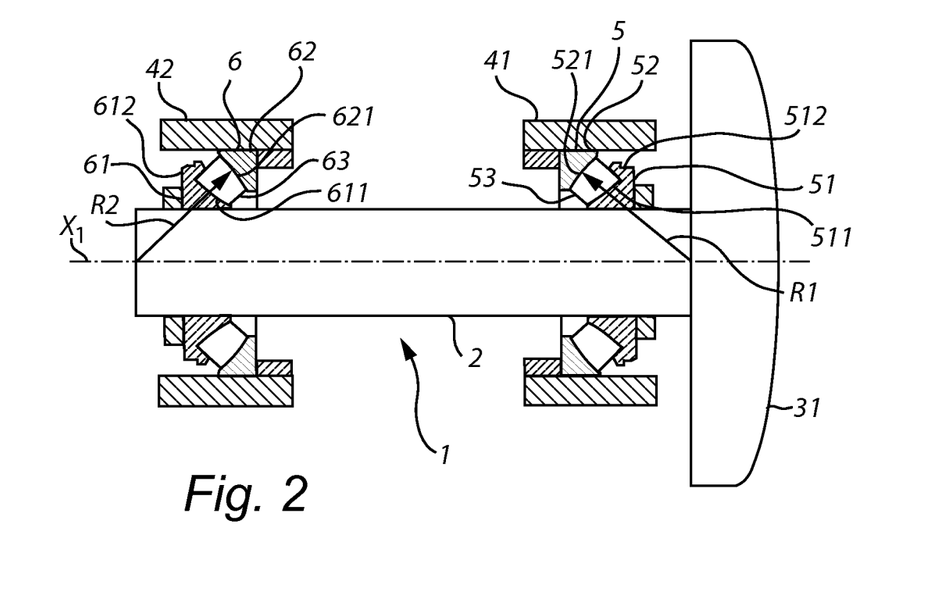
FIG. 2 shows a wind turbine rotor shaft arrangement according to an embodiment of the invention.

While FIG. 1 shows how the wind turbine bearing arrangement 1 may be located in a nacelle 11 of a wind turbine, FIG. 2, on the other hand, presents an embodiment of the wind turbine arrangement 1 in more detail. A rotor shaft 2 can be seen for supporting the wind turbine blades 3 via the hub 31. The arrangement 1 further comprises a non-rotating first housing structure 41 for supporting the rotor shaft 2, and wherein the first housing structure is arranged to be mounted to the nacelle framing 11. A first rolling bearing 5 is arranged to support, in a radial direction and in at least a first axial direction, the rotor shaft 2 in relation to the first housing structure 41 at a first support point. The bearing 5 is a single row self-aligning bearing comprising a first inner ring 51, a first outer ring 52 and a set of rollers 53. Each roller 53 is an asymmetrical roller and has a curved raceway-contacting surface arranged in contact with a curved inner raceway 511 of the first inner ring 51 and in contact with a curved outer raceway 521 of the first outer ring 52. A contact angle between each roller 53 and the inner and outer raceway 511 and 521 is inclined in relation to the radial direction of the rotor shaft 2. The raceway 521 further presents a radius R1 with a starting point in the central axis X1 of the rotor shaft 2 and the bearing 5. Furthermore, the arrangement 1 presents a second rolling bearing 6 arranged to support the rotor shaft 2 in relation to a second housing structure 42 at a second support point. In this specific embodiment, each roller 63 of the second roller bearing 6 is an asymmetrical roller and has a curved raceway-contacting surface arranged in contact with a curved inner raceway 611 of a second inner ring 61 and in contact with a curved outer raceway 621 of a second outer ring 62. A contact angle between each roller 63 and the inner and outer raceway 611 and 621 is inclined in relation to the radial direction of the rotor shaft 2. Moreover, in this specific embodiment, the first and second inner ring 51 and 61 present flanges 512 and 612 for guiding the rollers. More precisely, in this specific embodiment, the first and second bearings 5 and 6 are spherical roller thrust bearings. As for the first roller bearing 5, the second roller bearing's raceway 611 presents a radius R2 having a starting point in the central axis of the rotor shaft 2 and the bearing 6. As stated above, the two bearings may be mounted in either an X or O arrangement. In this embodiment the two SRTB's are mounted in an O-arrangement. The first and second bearing 5 and 6 also present cages or retainers for the rollers, which can not be seen in this figure. This arrangement is compact and also very reliable. The inclined angle of the raceways leads to that the bearings can accommodate high loads in both opposite axial directions and in the radial direction of the rotor shaft 2. In addition, the self-aligning capability due to the curved profile of the raceways 511, 521, 611, 621 and rollers 53, 63 will significantly reduce edge stresses in the zone between raceways and roller ends. Especially, the configuration of the first and second self-aligning rolling bearing 5 and 6 will lead to that the first outer ring 52 and the first inner ring 51 and the second outer ring 62 and the second inner ring 61 can be relatively misaligned, caused by e.g. deflections of the shaft, which will further increase service life and system reliability. Also, with this configuration, it is possible to preload the bearings, which will further increase system stiffness. This in combination with the self-aligning capability will lead to a bearing arrangement which will have an increased reliability and at the same time be compact.

Figure 3:
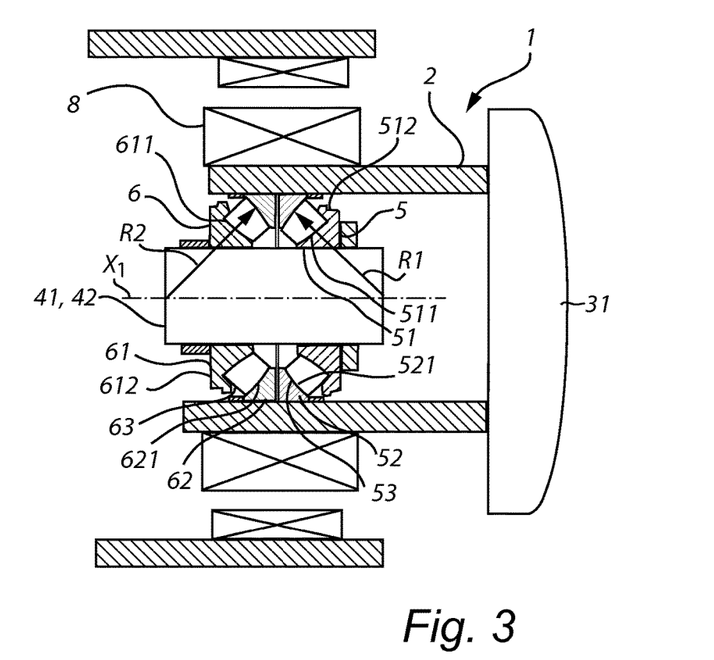
FIG. 3 is an illustration of another embodiment of the present invention disclosing a wind turbine rotor shaft arrangement wherein two bearings are located adjacent to each other.

In FIG. 3, another embodiment of the present invention can be seen. The figure shows a wind turbine rotor shaft arrangement 1, comprising a rotor shaft 2 for supporting wind turbine blades via a hub 31. Referring back to FIG. 2, where the inner rings 51 and 61 are supposed to rotate together with the rotor shaft 2, here in FIG. 3, the outer rings 52 and 62 are arranged to rotate with the rotor shaft 2, wherein the rotor shaft 2 is located radially outside the housing structure 41, 42. Thus the first and second housing structure 41 and 42 are here located on the radial inner side of the first and second bearing 5 and 6. The housing structure in any of the embodiments may be one single unit, but it may also be divided into several units. Moreover, a generator 8 is located radially outside the two bearings 5 and 6 and there is further no gearbox in this arrangement. The bearings 5 and 6 in this embodiment are represented by two spherical roller thrust bearings, presenting asymmetrical rollers 53 and 63, and flanges 512 and 612 on each bearing's inner rings 51 and 61. Also, as in the embodiment presented in FIG. 2, the radii R1 and R2 of the two bearing's raceways 511 and 611 have a starting point in the central axis X1 of the two bearings 5 and 6. In addition, the two bearings 5 and 6 are mounted next to each other in an O-arrangement leading to a very compact and rigid bearing arrangement for the wind turbine. The two bearing's 5 and 6 could likewise be mounted in an X-arrangement if preferred.

Figure 4:
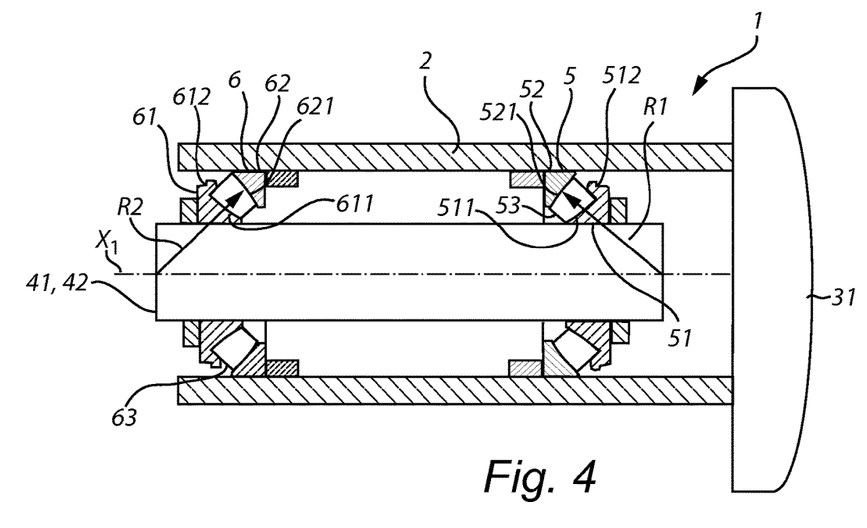
FIG. 4 shows another embodiment of a wind turbine rotor shaft according to the invention wherein the outer rings of the bearings are meant to be rotating.

FIG. 4 shows another embodiment where the outer rings 52 and 62 are meant to rotate and be in contact with a rotor shaft 2. The wind turbine rotor shaft arrangement comprises a rotor shaft 2 for supporting wind turbine blades via a hub 31. A first rolling bearing 5 is arranged to support, in a first axial direction, the rotor shaft 2 in relation to a housing structure 41 at a first support point. The rolling bearing 5 is a single row self-aligning roller bearing comprising a first inner ring 51, a first outer ring 52 and a set of rollers 53 interposed in-between the inner and outer rings 51, 52. The rollers 53 are asymmetrical rollers and has a curved raceway-contacting surface arranged in contact with curved inner and outer raceways 511 and 521, of the respective inner and outer ring 51 and 52. A contact angle between each roller 52 and the inner and outer raceway 511 and 521 is inclined in relation to the radial direction of the rotor shaft 2. A second bearing 6 is arranged in a remote position from the first rolling bearing 5 along the shaft 2. The rolling bearing 6 is arranged to support, in a second axial direction, the rotor shaft 2 in relation to the housing structure 42, which in this embodiment is the same housing structure as housing structure 41. Further, in this specific embodiment, the second rolling bearing 6 is also a self-aligning rolling bearing presenting asymmetrical rollers 63 situated in-between two curved raceways 611 and 621, which raceways are inclined in relation to the radial direction of the shaft 2. Furthermore, both bearings 5 and 6 present flanges 512 and 612 on each respective inner ring 51 and 52. The first and second raceways 521 and 621 of the respective outer rings 52 and 62 present a respective radius which both have starting points in the axial center line X1 of the bearings 5 and 6. In this arrangement, the bearings 5 and 6 are arranged in an O-arrangement, but it could likewise be arranged in an X-arrangement. In addition, as not shown in this or any other of the embodiments herein, the shaft 2 may have a varying diameter along its extension. Also the housing structures 41 and 42 may be designed in various ways, such as being integrated as one structure, separated into several parts, varying diameters along its axial extension, connected to the inner rings, connected to the outer rings etc.

Figure 5:
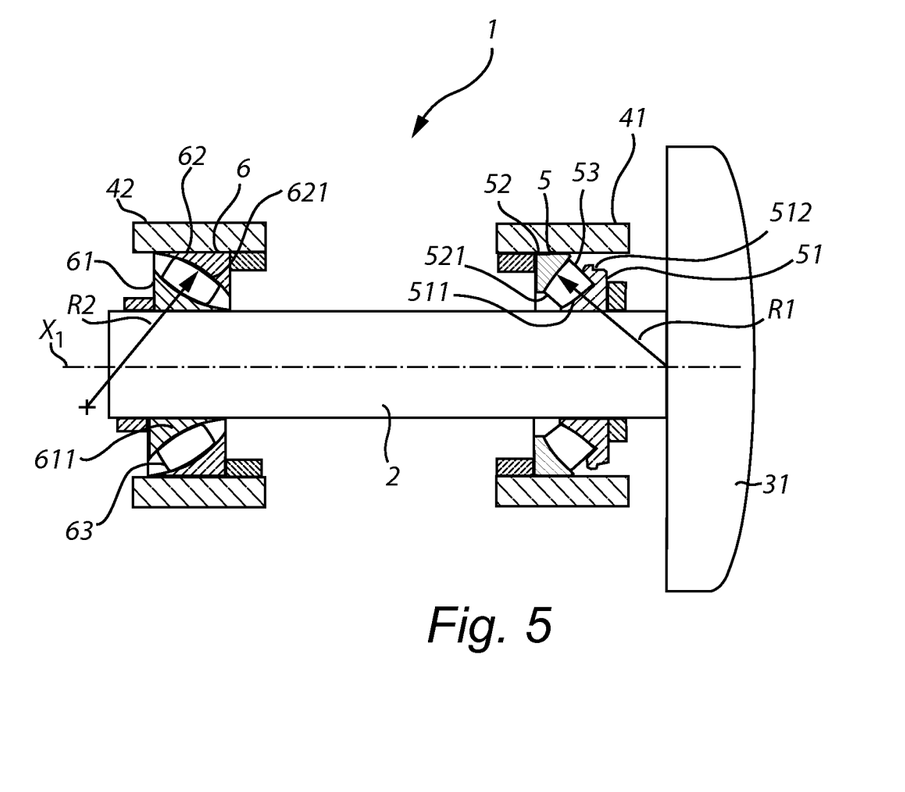
FIG. 5 shows another embodiment of a wind turbine rotor shaft arrangement according to the present invention wherein the two bearings are of different kind.

In FIG. 5, another embodiment of the present invention is shown. A rotor shaft 2 can be seen for supporting the wind turbine blades 3 via the hub 31. The arrangement further comprises a non-rotating first housing structure 41 for supporting the rotor shaft 2, and wherein the first housing structure is arranged to be mounted to the nacelle framing 11. A first rolling bearing 5 is arranged to support, in at least a first axial direction, the rotor shaft 2 in relation to the first housing structure 41 at a first support point. The bearing 5 is a single row self-aligning bearing comprising a first inner ring 51, a first outer ring 52 and a set of rollers 53. Each roller 53 is an asymmetrical roller and has a curved raceway-contacting surface arranged in contact with a curved inner raceway 511 of the first inner ring 51 and in contact with a curved outer raceway 521 of the first outer ring 52, wherein the raceways 511 and 521 are inclined in relation the radial direction of the shaft 2. The outer raceway 521 presents a radius R1 with a starting point in the central axis X1 of the rotor shaft 2 and the bearing 5. The bearing 5 further presents a flange 512 on its inner ring 51. The wind turbine rotor shaft arrangement 1 further presents a second rolling bearing 6 located remotely from the first rolling bearing 5 and in-between the rotor shaft 2 and a second housing structure 42. This roller bearing presents a second inner ring 61 and a second outer ring 62 and rolling elements 63 interposed in-between the rings 61 and 62. The rolling elements in this bearing are symmetrical rollers presenting an outer raceway-contacting surface located between an inner raceway 611 of the second inner ring 61 and an outer raceway 621 of the second outer ring 62. The raceways 611 and 621 are inclined in relation the radial direction of the shaft. This bearing is also a self-aligning bearing. This bearing type is sometimes named as a self-aligning torus or self-aligning toroidal bearing. Further in this embodiment, the outer raceway 621 presents a radius R2 which intersects and extends beyond the central axis X1 of the shaft and the bearing 6.

Figure 6:
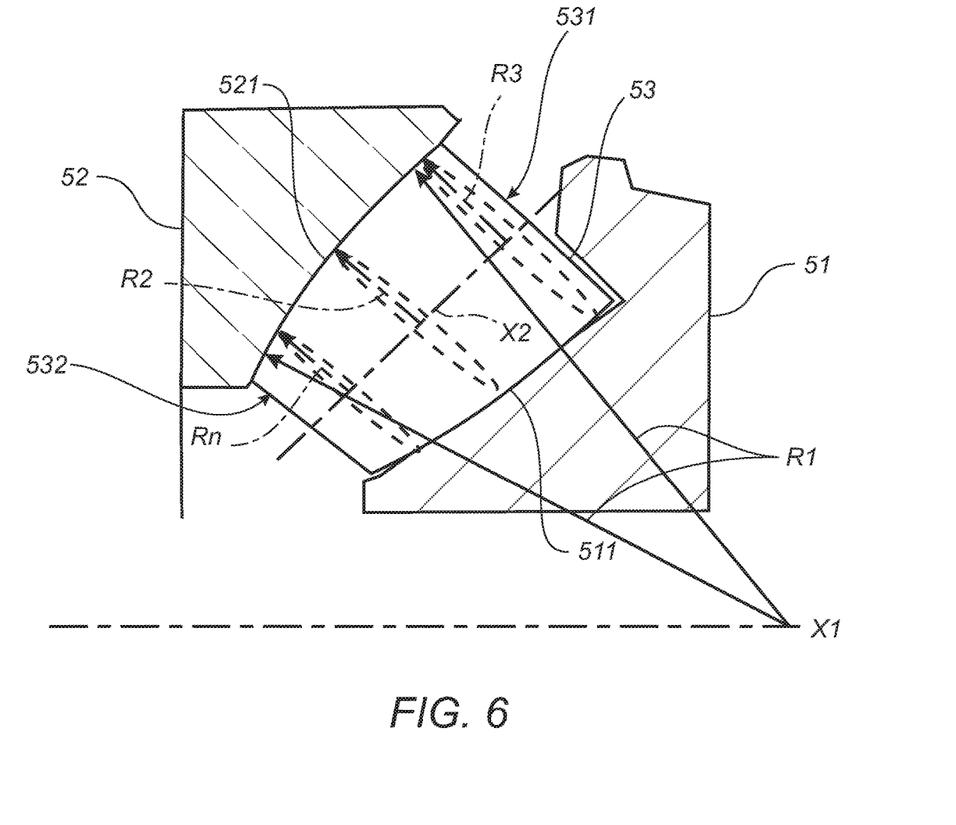
FIG. 6 shows a detailed section view of an exemplary bearing used to support the rotor shaft.

FIG. 6 shows a detailed drawing of an exemplary bearing integrated into the wind turbine rotor shaft arrangement 1. For reference, the illustration is sectioned along a plane that is defined by an axial direction of the roller and a radial direction of the roller. The bearing 5 includes a first inner ring 51, a first outer ring 52 and a set of rollers 53. The roller 53 is an asymmetrical roller having a first roller end 531, a second roller end 532 and a curved raceway-contacting surface extending between the first roller end 531 and the second roller end 532. A diameter of the bearing 5 at the first roller end 531 is larger than a diameter of the bearing 5 at the second roller end 532. A contact surface of the bearing 5 along an axial direction is non-linear (arched) between the first roller end 531 and the second roller end 532. A diameter of the bearing 5 at an axial center of the bearing 5 is greater than an average of the diameter of the bearing 5 at the first roller end 531 and the diameter of the bearing 5 at the second roller end 532. A diameter of the bearing 5 between the first roller end 531 of the bearing 5 and the second roller end 532 of the bearing 5 varies in accordance with radius R1. The contact surface of the bearing 5 has a shape defined by a circular cross section having a radius R3, R4, Rn; wherein each radius of the circular cross section shape extends from an elongated axis X2. The circular cross section is oriented perpendicular to the elongated axis X2. Each cross section radius R3, R4, Rn differs with one another in a non-linear arrangement along a length of the elongated axis X2 between the first roller end 531 and the second roller end 532. More specifically, each cross section radius R3, R4, Rn defines the contact surface in accordance with radius R1. The curved inner raceway 511 of the first inner ring 51 and the curved outer raceway 521 of the first outer ring 52 mirror the contact surface of the bearing 5, extending between a peripheral edge of the first roller end 531 of the bearing 5 and a peripheral edge of the second roller end 532 of the bearing 5.

What is claimed is:

1. A wind turbine rotor shaft arrangement, comprising:
   a rotor shaft for supporting wind turbine blades;
   a non-rotating first housing structure for supporting the rotor shaft, which first housing structure is arranged to be mounted to a wind turbine nacelle framing; and
   a first rolling bearing arranged to support, in radial direction and in at least a first axial direction, the rotor shaft in relation to the first housing structure at a first support point, which first rolling bearing is a single row self-aligning bearing comprising a first inner ring, a first outer ring and a set of rolling elements formed of rollers interposed between the first inner and outer rings;
   wherein each roller is an asymmetrical roller having a first roller end, a second roller end and a curved raceway-contacting surface, a diameter of the asymmetrical roller at the first roller end is larger than a diameter of the asymmetrical roller at the second roller end, the curved raceway-contacting surface extending between a peripheral edge of the first roller end and a peripheral edge of the second roller end, the curved raceway-contacting surface is formed having an arched shape along an intersection between the curved raceway-contacting surface and a plane defined by an axial direction of the roller and a radial direction of the roller, wherein the arched shape is defined by a constant radius having a starting point at a central axis of the rotor shaft, terminating at the curved raceway-contacting surface of the bearing, the curved raceway-contacting surface is arranged in contact with a curved inner raceway of the first inner ring and in contact with a curved outer raceway of the first outer ring, wherein a contact angle between each roller and at least one of the inner raceway and the outer raceway is inclined in relation to the radial direction of the rotor shaft, a non-rotating second housing structure for supporting the rotor shaft, wherein the second housing structure is arranged to be mounted to the wind turbine nacelle framing; and a second rolling bearing arranged to support the rotor shaft in relation to the second housing structure at a second support point.

2. A wind turbine rotor shaft arrangement according to claim 1, wherein the second rolling bearing is a single row self-aligning bearing, arranged to support in radial direction and in a second opposite axial direction, the second rolling bearing comprising a second inner ring, a second outer ring and a second set of rolling elements formed of rollers interposed between the second inner ring and the second outer ring, and wherein a contact angle between each roller and at least one of an inner raceway of the second inner ring and an outer raceway of the second outer ring is inclined in relation to the radial direction of the rotor shaft.

3. A wind turbine rotor shaft arrangement according to claim 2, wherein each roller of the second set of rolling elements is an asymmetrical roller and has a curved raceway-contacting surface arranged in contact with the inner raceway of the second inner ring and in contact with the outer raceway of the second outer ring, wherein the inner raceway of the second inner ring is curved and the outer raceway of the second outer ring is curved.

4. A wind turbine rotor shaft arrangement according to claim 1, wherein a radius of the curved outer raceway of one of the first outer ring of the first rolling bearing or a second outer ring of the second rolling bearing extends from a center point on a bearing axis of one of the first rolling bearing or the second rolling bearing, respectively.

5. A wind turbine rotor shaft arrangement according to claim 1, wherein at least one of the first inner ring of the first rolling bearing or a second inner ring of the second rolling bearing presents a flange located adjacent to the curved inner raceway of one of the first inner ring of the first rolling bearing or the second inner ring of the second rolling bearing, respectively.

6. A wind turbine rotor shaft arrangement according to claim 5, wherein the at least one flange comprises elements of at least one of a guiding flange and a roller retaining flange.

7. A wind turbine rotor shaft arrangement according to claim 1, wherein the first rolling bearing and the second rolling bearing are located axially remotely from each other on the rotor shaft.

8. A wind turbine rotor shaft arrangement according to claim 1, wherein the first rolling bearing and second rolling bearing are located axially adjacent to each other on the rotor shaft.

9. A wind turbine rotor shaft arrangement according to claim 8, wherein the first inner ring of the first rolling bearing and a second inner ring of the first rolling bearing and the first inner ring of the second rolling bearing and a second inner ring of the second rolling bearing are integrated.

10. A wind turbine rotor shaft arrangement according to claim 8, wherein the first outer ring of the first rolling bearing and a second outer ring of the first rolling bearing and the first outer ring of the second rolling bearing and a second outer ring of the second rolling bearing are integrated.

11. A wind turbine rotor shaft arrangement according to claim 1, wherein at least one of the first outer ring of the first rolling bearing and a second outer ring of the second rolling bearing presents a mounting flange for mounting at least one of the first rolling bearing of the first rolling bearing and the second rolling bearing of the second rolling bearing to one of the first housing structure, the second housing structure, or the shaft.

12. A wind turbine rotor shaft arrangement according to claim 1, wherein at least one of the first inner ring of the first rolling bearing and a second inner ring of the second rolling bearing presents a mounting flange for mounting at least one of the first rolling bearing and the second rolling bearing to one of the first housing structure, the second housing structure, or the shaft.

13. A wind turbine rotor shaft arrangement according to claim 1, wherein at least one of the first rolling bearing and the second rolling bearing is a spherical roller thrust bearing.

14. A wind turbine rotor shaft arrangement according to claim 1, wherein the second rolling bearing is one of a spherical roller bearing, a self-aligning torus bearing, or a toroidal roller bearing.

15. A wind turbine rotor shaft arrangement according to claim 1, wherein the second rolling bearing is one of a tapered roller bearing or a cylindrical roller bearing.

* * * * *